Feb. 6, 1968  C. RAGETTLI ET AL  3,367,815

METHOD AND APPARATUS FOR FORMING FILAMENT WOUND VESSELS

Filed Dec. 14, 1964  5 Sheets-Sheet 1

INVENTORS.
CHRISTIAN RAGETTLI
JAN LEEUWERIK
BY
Wolfe, Hubbard, Voit & Osann
ATTORNEYS.

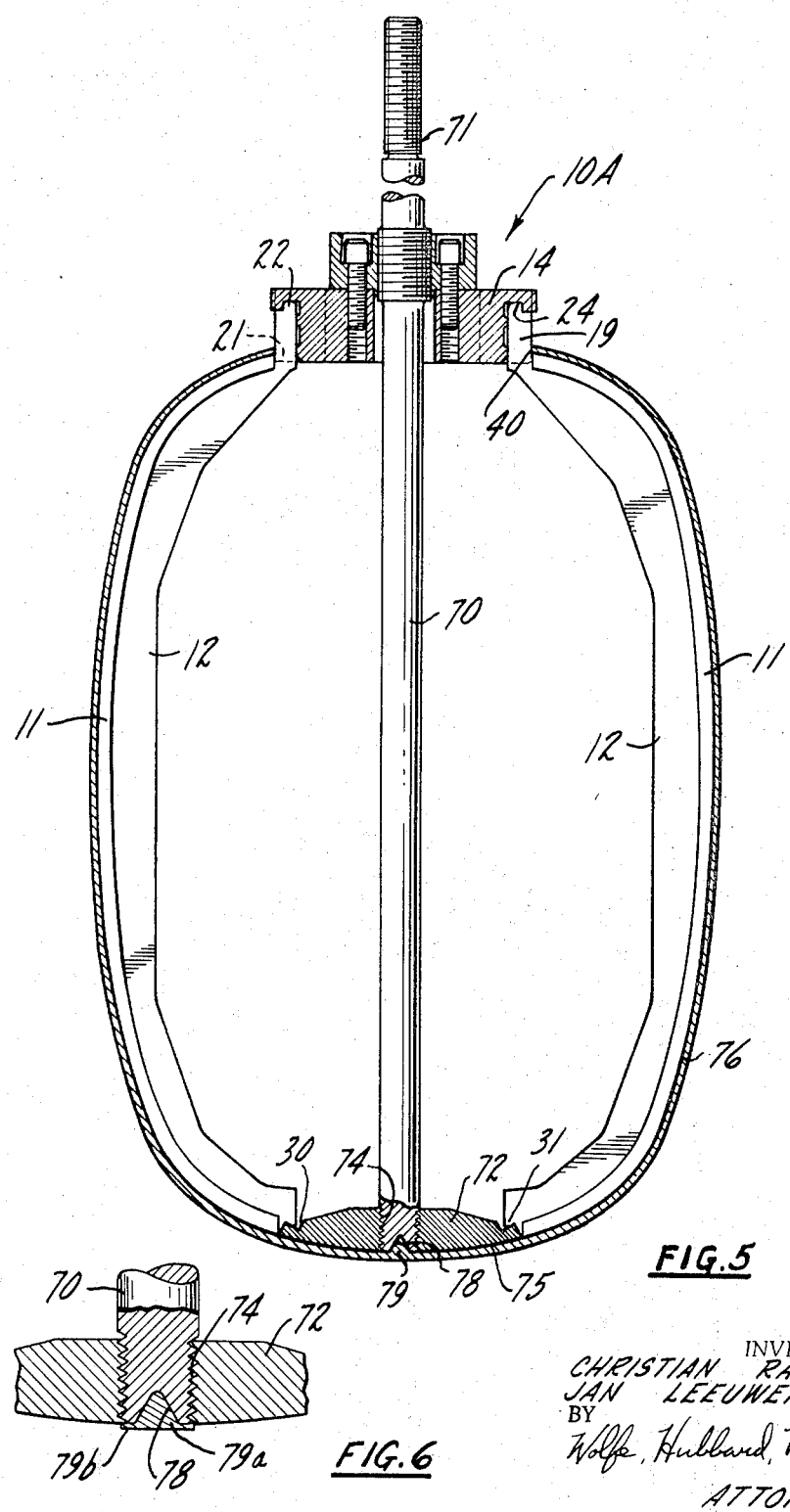

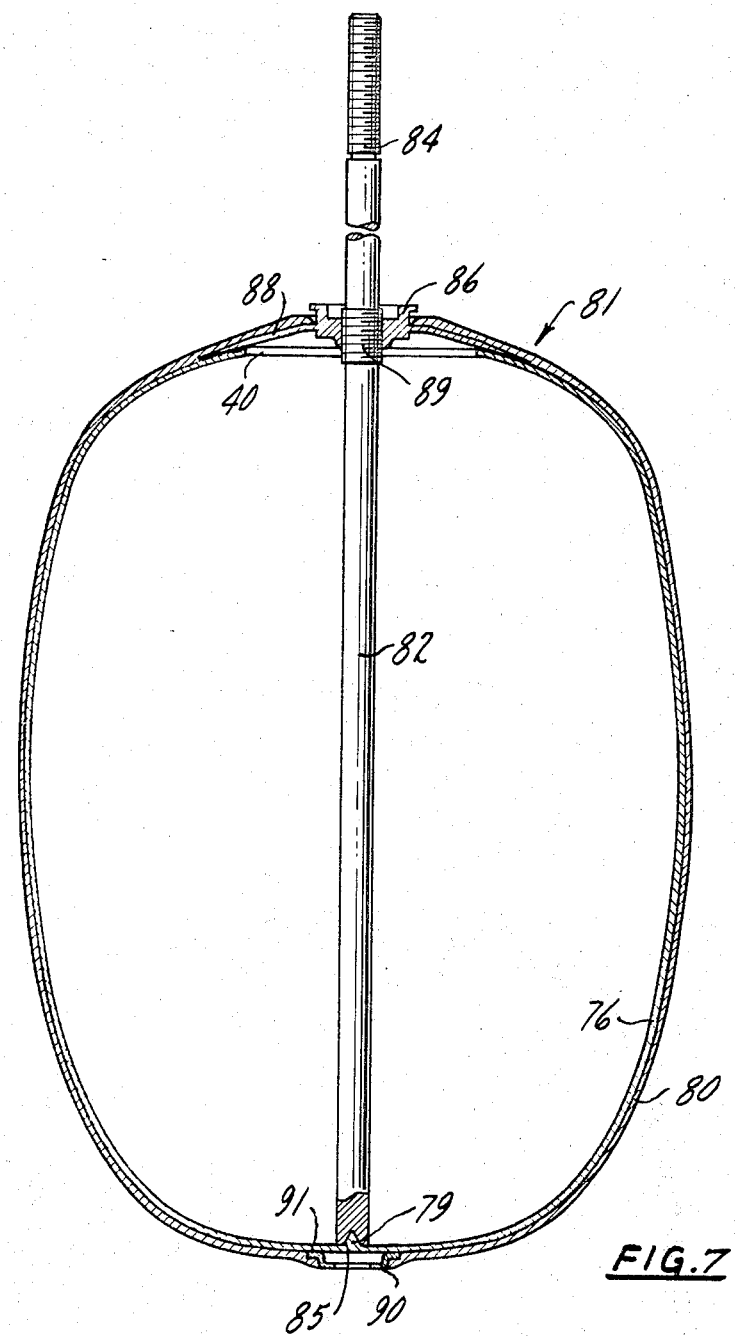

United States Patent Office 3,367,815
Patented Feb. 6, 1968

3,367,815
METHOD AND APPARATUS FOR FORMING
FILAMENT WOUND VESSELS
Christian Ragettli, Zurich, Switzerland, and Jan Leeuwerik, Amstelveen, Netherlands, assignors to Metal Containers Limited, London, England, a company under the laws of the United Kingdom
Filed Dec. 14, 1964, Ser. No. 418,235
11 Claims. (Cl. 156—175)

ABSTRACT OF THE DISCLOSURE

A method for forming a filament wound vessel comprising forming a first wound shell of resin impregnated filaments about a collapsible mandrel having a detachable fitting with a relatively large polar opening, curing the first shell to bond the fitting to the shell, removing the mandrel through the opening, mounting the fitting and shell on a shaft with a second fitting disposed in the opening, forming a second wound shell of resin impregnated filaments amout the first shell while using the latter as a mandrel with the winding overlying the second fitting and bridging the annular open space and curing the vessel.

---

The present invention relates generally to containers and, more particularly, to filament wound vessels. In its principal aspect, the invention is concerned with improved methods and apparatus for forming filament wound vessels and to improved vessels formed thereby.

Although various techniques have heretofore been developd for the manufacture of filament wound vessels, manufacturers have, nevertheless, found it necessary in each instance to form the vessel sidewall by winding the filaments about a centrally disposed forming mandrel in accordance with a desired or preselected winding pattern. Normally the filaments are impregnated or moistened with, for example, a suitable synthetic resin which may be applied to the filaments either before, during or following the winding operation. The wound, resin impregnated or moistened shell is then cured or hardened in any suitable manner such as by heat treating or the like.

Unfortunately, while the use of a forming mandrel has been and continues to be a manufacturing necessity in the formation of filament wound vessels, such mandrels have, at the same time, introduced a number of disadvantages and manufacturing complexities into this type of an operation. One of the foremost problems encountered has been that of removing the mandrel from the wound shell while at the same time maintaining the openings at the pole end or ends of the shell comparatively small. In an effort to solve this problem, it has, for example, been proposed that the mandrel take the form of an inflatable bag or diaphragm made of flexible material such as rubber. However, this "solution" has not proven satisfactory from either a manufacturing or an economical standpoint. One principal reason for the failure of the inflatable mandrel to provide a satisfactory solution to the problem has been that of finding a material that can be used in making the bag or diaphragm. Thus, such a material must be characterized by (1) possessing sufficient flexibility to permit ready removal from a comparatively small opening in the wound and cured shell, (2) possessing sufficient stiffness to permit its effective use as a forming mandrel, and (3) its ability to withstand the temperatures encountered during curing or hardening of the resin. Unfortunately, however, it has been difficult to find a suitable bag material which is economically practical and which is damage, wear and creep resistant, yet which is also strong enough to resist deformation or distortion during winding so as to insure production of a wound product having a desired shape.

Yet another proposed "solution" to the problem has been that of forming the mandrel of either a meltable or soluble material, thus permitting subsequent removal of the mandrel by either melting or dissolving the mandrel material. Again, this proposal has not proven satisfactory because of the difficulty in finding a material which is both economically and technically acceptable for use in making the mandrel. Moreover, since the mandrels must be destroyed subsequent to each winding operation, they are not reusable, thereby further adding to the cost of such an operation.

In view of the difficulties that have been encountered in providing effective and economically practical procedures and apparatus which permit of easy removal of mandrels from the wound shells, it has been further proposed than a mandrel be employed which is actually left in the shell—that is, the mandrel becomes a part of the wound filament vessel. While this, of course, avoids the problems connected with removal of the mandrel from the shell, it has not provided a satisfactory solution to the problem and, indeed, the proposal to leave the mandrel in the wound shell has actually evolved numerous additional problems that must be surmounted. For example, not only is the cost of the wound vessel increased by the value of the "lost" mandrel, but, moreover, the weight of the mandrel is added to the weight of the found vessel, thus increasing handling costs of the latter. Consequently, provision must be made for minimizing the weight of the mandrel. Additionally, the capacity of the vessel is reduced in those instances where the mandrel is left in place within the wound shell.

More often than not wound vessels must meet certain strict requirements as to, for example, rigidity and gastightness and, consequently, such vessels are often subjected to rigorous testing procedures. However, it has been found that when vessels having a mandrel contained therein are subjected to "drop tests," the mandrel has a tendency to buckle inwardly, thus weakening the vessel. This characteristic would, of course, also manifest itself during actual use of such vessels. Still another disadvantage of this latter type of construction resides in the fact that the coefficients of thermal expansion and contraction of the wound vessel and the inner shell or mandrel (which is usually formed of metal) often differ considerably, thus giving rise to difficulties during curing of the vessel, or when the vessel is subjected to very low temperatures, or both.

It is a general aim of the present invention to provide improved methods and apparatus for forming filament wound vessels which not only overcome all of the foregoing disadvantages, but which serve to insure production of improved filament wound vessels characterized by their lightness in weight, economy, durability and reliability in use. In this connection, it is also a general aim of the present invention to provide such improved lightweight, economical, durable and reliable filament wound vessels.

A related and more specific object of the invention is the provision of improved and novel filament winding procedures wherein a wound shell is formed during at least two successive winding stages and wherein during the second or latter stages the partially wound shell itself serves as a forming mandrel, thus permitting removal of relatively bulky mandrel components from the interior of the shell prior to the time that the latter is completely formed.

An ancillary object of the invention is the provision of improved filament winding methods which permit the repetitive use of collapsible mandrels having comparatively bulky components selected for their durability and economy in use, yet wherein the finished wound vessels include only one or two comparatively small openings having comparably small fittings integrally formed therein. Stated another way, it is an object of the invention to provide an improved method for forming filament wound vessels about an internally disposed, coaxial, collapsible mandrel, yet wherein the mandrel components can be readily removed with ease from the interior of such vessels during the manufacture thereof despite the fact that the cross-sectional dimensions of such mandrel components greatly exceed the diameter of the opening or openings formed in the finished wound vessel.

Other objects and advantages of the invention will become apparent as the following description proceeds, taken in conjunction with the accompanying drawings, in which:

FIG. 5 is a longitudinal sectional view similar to FIG. 1, but depicting a slightly modified form of the invention which is particularly suitable for forming filament wound vessels of the type having only one axially disposed opening formed therein, the vessel here being illustrated while supported on a collapsible mandrel upon completion of the formation of the inner shell thereof;

Figure 1:
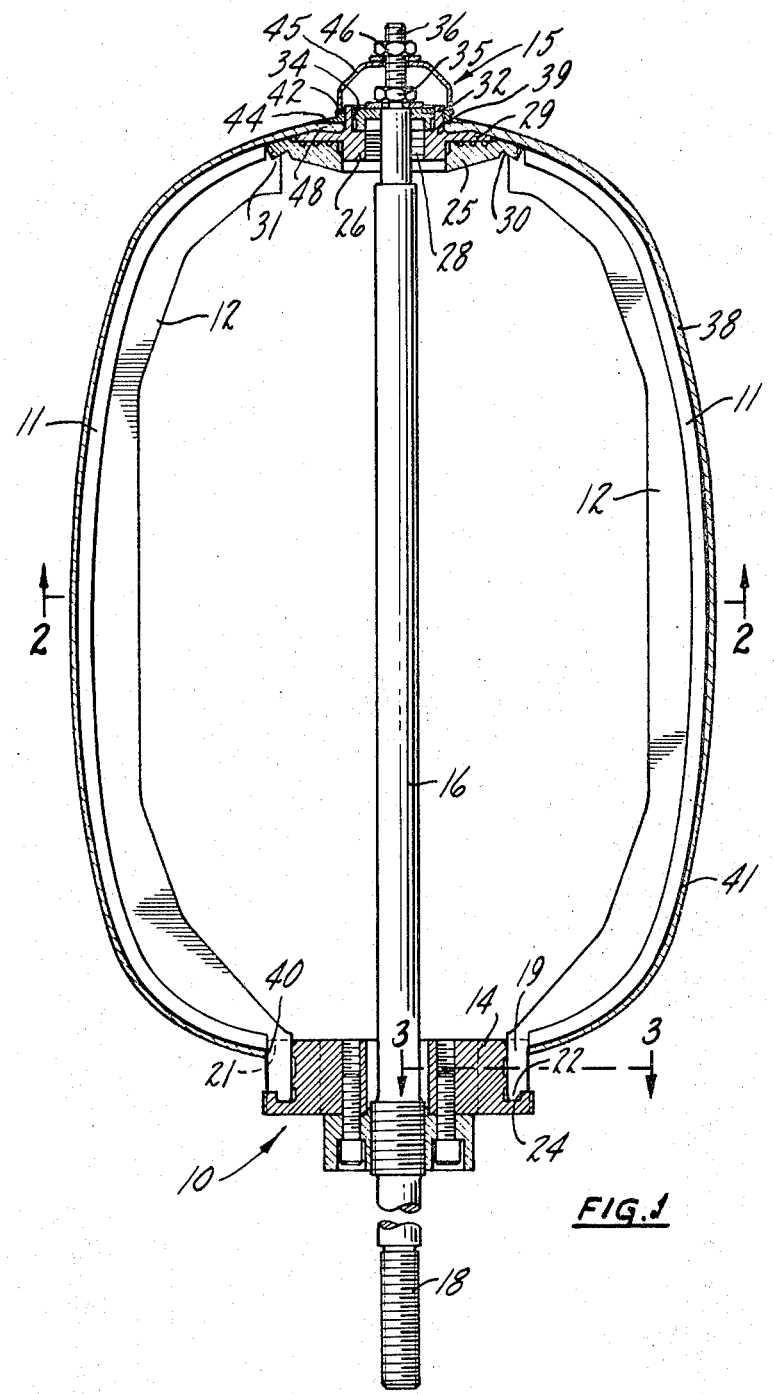
FIGURE 1 is a longitudinal cross-sectional view here depicting a filament wound vessel upon completion of formation of the inner shell of such vessel but prior to formation of the outer shell thereof, such inner shell here being supported on a coaxial collapsible mandrel, all in accordance with the present invention.

FIG. 6 is a fragmentary vertical section on an enlarged scale illustrating the lower end of the mandrel shown in FIG. 5, and further illustrating the novel vessel centering means employed with this form of the invention, such centering means being adapted to be subsequently utilized to properly orient the formed inner shell prior to and during formation of the outer shell; and, FIG. 7 is a view similar to FIG. 4, but here depicting a vessel wound in accordance with the modified form of the invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring now to the drawings, there is illustrated in FIG. 1 an exemplary collapsible forming mandrel, generally indicated at 10, which is particularly suitable for forming filament wound vessels in accordance with the present invention. As here shown, the forming mandrel 10 includes a plurality of axially extending stave-like members 11 which are generally T-shaped in cross section (FIG. 2), each member including a radially extending web 12. The stave members 11 are preferably supported 1) by a hub 14 and adjacent their opposite ends by a hub adjacent one end (e.g., the lower end as viewed in FIG. assembly, generally indicated at 15, the hub 14 and hub assembly 15 here being supported on, and rotatably driven by, a coaxial driven rotary shaft 16 which is provided with screw threads 18 or the like for the purpose of mounting the shaft 16, and hence the mandrel 10, in a suitable winding machine (not shown). Of course, those skilled in the art will appreciate that means other than the exemplary threaded connection 18 could be utilized to couple the mandrel 10 to the winding machine such, for example, as a conventional splined or key and groove construction (not shown).

Figure 3:
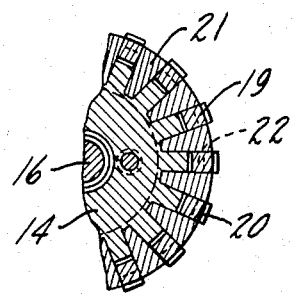
FIG. 3 is a fragmentary transverse sectional view taken substantially along the line 3—3 of FIG. 1.

In carrying out the present invention, the stave members 11 are releasably supported by the hub 14 and hub assembly 15 in circumferentially disposed side-by-side relation so as to define a collapsible mandrel 10 having a peripheral contour which substantially conforms in shape and dimensions to the desired final configuration of the vessel to be wound. To this end, the webs 12 of the stave members 11 terminate in axially extending projections 19 which are positioned within respective different ones of a plurality of axially extending radial slots 20 defined by angularly disposed radial partitions 21 mounted or formed in the marginal edge of the hub 14, as best shown in FIG. 3. To prevent accidental radial dislodgment of the stave members 11 prior to or during a filament winding operation, the projections 19 are provided with axially extending tongues 22 which are received within an annular groove 24 formed in the hub 14. Thus, the arrangement is such that the angularly disposed partitions 21 serve to space the stave members 11 equidistantly apart about the periphery of the hub 14.

For the purpose of supporting the opposite ends of the stave members 11 (i.e., the upper ends as viewed in FIG. 1), the hub assembly 15 includes an annular hub ring 25 which is here removably mounted on an annular ring 26 having an interally threaded axial bore 28 and a radially extending annular flange 29. Thus, the ring 26, by virtue of its construction, will ultimately serve as a fitting which is integral with the filament wound vessel and which is adapted to receive, for example, a suitable closure and discharge value or the like (not shown). In order to properly orient the stave members 11, a groove 30 is formed in the marginal edge of the hub ring 25, the groove 30 being positioned and shaped so as to accommodate complementally shaped teeth 31 formed on the ends of the webs 12 which form part of the stave members. To insure that the hub ring 25 and fitting 26 are centered on and coaxial with the shaft 16, a centering ring 32 is snugly but removably positioned within a counterbore 34 formed in the fitting 26. The centering ring 32 is secured to the driven shaft 16 by means of a nut 35 which is threaded onto screw threads 36 formed on the extremity of the shaft. From the foregoing it will, therefore, be seen that the fitting 26, although restrained from either axial or radial movement relative to the shaft 16 because of coaction with the hub ring 25 and centering ring 32, is nevertheless detachably secured to the mandrel 10.

Once the collapsible mandrel 10 (FIG. 1) has been assembled in the manner hereinabove described, it is then mounted in any suitable winding machine (not shown) by means of the threaded portion 18 of the shaft 16. The particular type of winding machine employed and the particular winding pattern utilized are not critical to the present invention and may take various forms well known to those skilled in the art. It should suffice for the purpose of understanding the present invention to point out that the winding machine could, merely by way of example, include means for rotating the shaft 16 about a single axis while simultaneously feeding filaments to the mandrel 10 by means of a rotating winding arm. Alternatively, the shaft 16 could be rotated about two different axes, in which case the filament feeding means can remain stationary. Such winding machines are well known in the art and need not be further described here.

In accordance with one of the important aspects of the present invention, provision is made for forming a filament wound vessel in such a manner that the mandrel 10 can be collapsed and removed from the vessel being formed before completion of the winding operation with the partially wound vessel thereafter serving as a mandrel that is left in place and which becomes an integral part of the completed vessel. To this end, provision is made for forming the vessel in successive winding stages during which inner and outer shells are formed in sequential order, such shells being in mutual, coextensive, face-to-face, contact throughout and substantially identical in configuration except that the inner shell is provided with a comparatively large polar opening which permits easy removal of the various components of the collapsible mandrel 10.

In keeping with the foregoing aspect of the present invention, and as best illustrated in FIG. 1, filaments are asymmetrically wound about the mandrel 10 and over the flange 29 by any suitable winding machine (not shown) so as to form a first or inner shell 38 having a relatively small polar opening 39 concentric with the fitting 26 and a relatively large polar opening 40 concentric with the hub 14. Consistent with the principal objectives of the present invention, the smaller polar opening 39 thus formed is sized to permit use of a relatively small, lightweight fitting 26, thereby not only minimizing the weight of the finished vessel, but also the cost of the fitting. The larger polar opening 40 thus formed is, on the other hand, sized to permit subsequent removal of the mandrel components 11, 14, 16 and 25. The filaments can be impregnated or moistened with a suitable synthetic resin which may be applied to the filaments either before, during or following the above-described winding operation. The particular resin used does not form a part of this invention and can be any of the many resins identified in the prior art. As set forth in Australian Patent Number 250,808, epoxy-type cold or hot curing resins are representative examples of specific resins.

In order to facilitate later removal of the collapsible mandrel 10 from the inner shell 38, a suitable release agent may be applied to the mandrel and, in particular, to the outer surfaces of the stave members 11, such release agent being applied prior to the filament winding operation. Those skilled in the art will appreciate that various release agents can be used without departing from the spirit and scope of the invention, and the particular manner of applying the release agent will, of course, depend upon the nature and consistency of the specific agent selected. For example, where the agent is liquid or greaselike in consistency it can be brushed on the stave members 11 or, in some instances, it can be sprayed thereon. However, it has been found that particularly advantageous results are achieved when the release agent takes the form of sheet material such as polypropylene (represented by the heavy line 41 in FIGS. 1 and 2). Thus, such sheet material 41, when strap-like or ribbon-like in form, lends itself to application to the mandrel 10 by winding procedures conducted prior to formation of the filament wound shell 38. Alternatively, such sheet material can be formed into hoods or caps of, for example, polypropylene film having shapes corresponding to approximately one half of the mandrel, thereby permitting disposition of two such hoods on opposite ends or sides of the mandrel 10 prior to the filament winding operation.

In order to strengthen the connection between the end member or fitting 26 and the shell 38, means are provided for urging the flange 29 on the fitting into intimate face-to-face contact with the overlying portion of the wound shell. To accomplish this a retaining ring 42 having an annular, generally radial flange 44 is positioned on the axially projecting hub portion of the fitting 26 and then pressed towards the flange 29 on the latter, thus effectively clamping the shell 38 between the flange 29 and the flange 44. Of course, since the shell 38 is formed of resin impregnated filaments, it will be understood that compressive loading on the shell between the flanges 29 and 44 will tend to urge resin into intimate contact with the flanges and, indeed, even into the annular space between the ring 42 and the fitting 26. Consequently, when the resin is subsequently hardened or cured, the retaining ring 42, shell 38 and fitting are all adhesively bonded to one another so as to form a rigid unitary construction. If desired, additional resin or other suitable adhesive can be applied to the connection prior to curing so as to further enhance the strength thereof. In the illustrative form of the invention shown in FIG. 1, the retaining ring 42 is pressed axially towards the flange 29 on the fitting 26 by means of a cap 45, the latter being urged in an axial direction by tightening a nut 46 coupled to the threaded portion 36 of the driven shaft 16.

In carrying out the present invention, provision is also made for further strengthening the adhesively bonded connection between the shell 38 and the flanges 29, 44 so as to inhibit the tendency of the shell 38 to pull out of the annular space between the flanges when the wound vessel is internally pressurized. To this end, the flange 29 on the end member or fitting 26 is preferably slightly "dished" or concave in cross section (FIG. 1) with the dished face or concavity facing outwardly and defining a seat for the filaments of the shell 38. Consequently, when the retaining ring 42 is applied and pressed toward the flange 29, the edge 48 of the shell 38 surrounding the opening 39 is clamped in an annular space between the flanges 29, 44 such annular space progressively decreasing in axial height from its inner peripheral edge (adjacent the hub portion of the fitting 26) to its outer peripheral edge (adjacent the outer periphery of flange 44). The arrangement is such that when the shell is internally pressurized, thereby producing forces which tend to pull the edge 48 of the shell out of the annular space between the flanges 29, 44, the wedge-shaped cross-sectional configuration of the shell edge 48 acts to prevent radial withdrawal of the shell thereby rendering the connection between the fitting 26 and the shell 38 even more resistant to deformation forces.

Having wound the resin impregnated or moistened inner shell 38 and having also established a rigidly clamped connection between the fitting 26, shell 38, and retaining ring 42, the partially wound vessel is now ready for a first curing operation in accordance with the present invention. The particular method employed for curing, and thus hardening, the resin impregnated shell 38 is not critical to the present invention. Thus, the resin may be cured by, for example, subjecting the shell 38 to heat treatment or, alternatively, it may be cured at room temperature by chemical action. Both of the foregoing procedures are well known to those skilled in the art and, therefore, need not be further detailed herein. It is, however, essential that the particular curing procedure employed be carried out while the shell 38 is still wound about and supported by the collapsible mandrel 10.

Upon completion of the curing operation, the mandrel 10 is collapsed and removed from the shell 38 through the relatively large polar opening 40 formed in the latter. To accomplish this, the nut 46 and cap 45 are first removed from the threaded end 36 of the shaft 16, thus exposing the nut 35 and centering ring 32. However, the retaining ring 42 remains seated in place because of its adhesively bonded connection to the shell 38 and fitting 26 resulting from the curing operation. The nut 35 and centering ring 32 are then removed axially from the threaded portion 36 of the shaft 16, thus releasing the shell 38 from the mandrel 10 and permitting axial removal of the shaft 16 and hub 14 through the polar opening 40 in the shell. This, of course, serves to release the stave tongues 22 from the groove 24 in the hub 14, thereby permitting generally inward radial movement of the stave members 11 (at least the lower ends thereof as viewed in FIG. 1) relative to the now rigid shell 38 so as to free the teeth 31 on the staves from the groove 30 in the hub ring 25.

Figure 2:
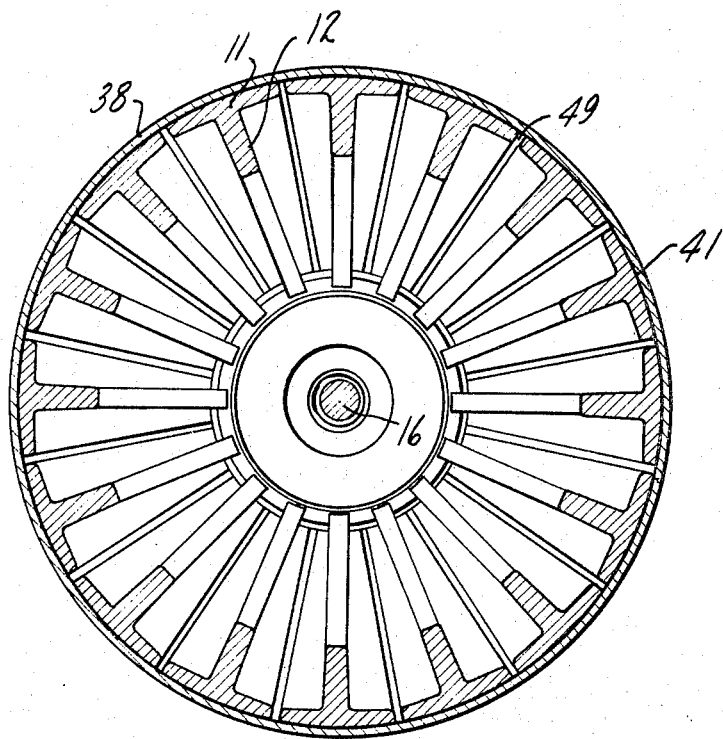
FIG. 2 is a fragmentary transverse sectional view taken substantially along the line 2—2 of FIG. 1.

To facilitate such radial inward movement of the stave members 11, the latter are preferably dimensioned so that they are slightly spaced from one another as best indicated at 49 in FIG. 2, such clearance 49 permitting relative movement between the stave members 11 during collapse of the mandrel 10. The stave members 11 and hub ring 25 are then all removed from the interior of the shell 38 through the polar opening 40. In those instances where a release agent formed of sheet material 41 is employed to facilitate separation of the stave members 11 from the inner surface of the shell 38, such sheet-like release agent will be withdrawn from the shell either simultaneously with the stave members 11, or, alternatively, it may be subsequently withdrawn therefrom.

It will be appreciated from the foregoing that in practicing the method of the present invention as thus far described, there will be produced an integral assembly of a wound filament shell 38 and a relatively small, light-weight fitting 26 disposed at one polar end of the shell. Such integral shell and fitting assembly will, of course, be characterized by its strength in view of the novel wedge-shaped shell configuration at the shell edge 48 confined between the flanges 29 and 44. The actual strength of the shell 38 and its suitability for use as a filament wound vessel will depend upon various conditions which can be controlled by the manufacturer. For example, it will be appreciated that the thickness of the shell 38 may be easily controlled by varying the amount of material wound about the mandrel. Indeed, the inner shell 38 could, if desired, itself be constituted by two or more laminations of filament windings. This would, of course, permit the winding of a second outer lamination about a first inner lamination, in which event the second outer lamination could be wound in such a manner as to overlie all or part of the flange 44 on the retaining ring 42, thus further strengthening the assembly.

Of course, if the shell 38 were to be used as a completed vessel, it would be necessary to mount a fitting in the relatively large polar opening 40 either incident to the winding operation described above or subsequent to curing the shell 38 and after removal of the mandrel. In each instance, however, the shell would have to include an opening of sufficient size as to permit removal of the mandrel components—that is, where the bottom fitting is mounted in the vessel as the latter is wound, the diameter of the opening in the fitting would have to exceed the diameter of, for example, the hub ring 25. On the other hand, if the bottom fitting is subsequently attached to the cured shell 38, the diameter of the hole 40 in the latter would have to exceed the diameter of the hub ring 25. Unfortunately, both of the foregoing constructions would necessitate the use of an excessively large fitting which would unduly increase the weight of the finished vessel, the cost of production thereof, and the cost of handling thereof.

Figure 4:
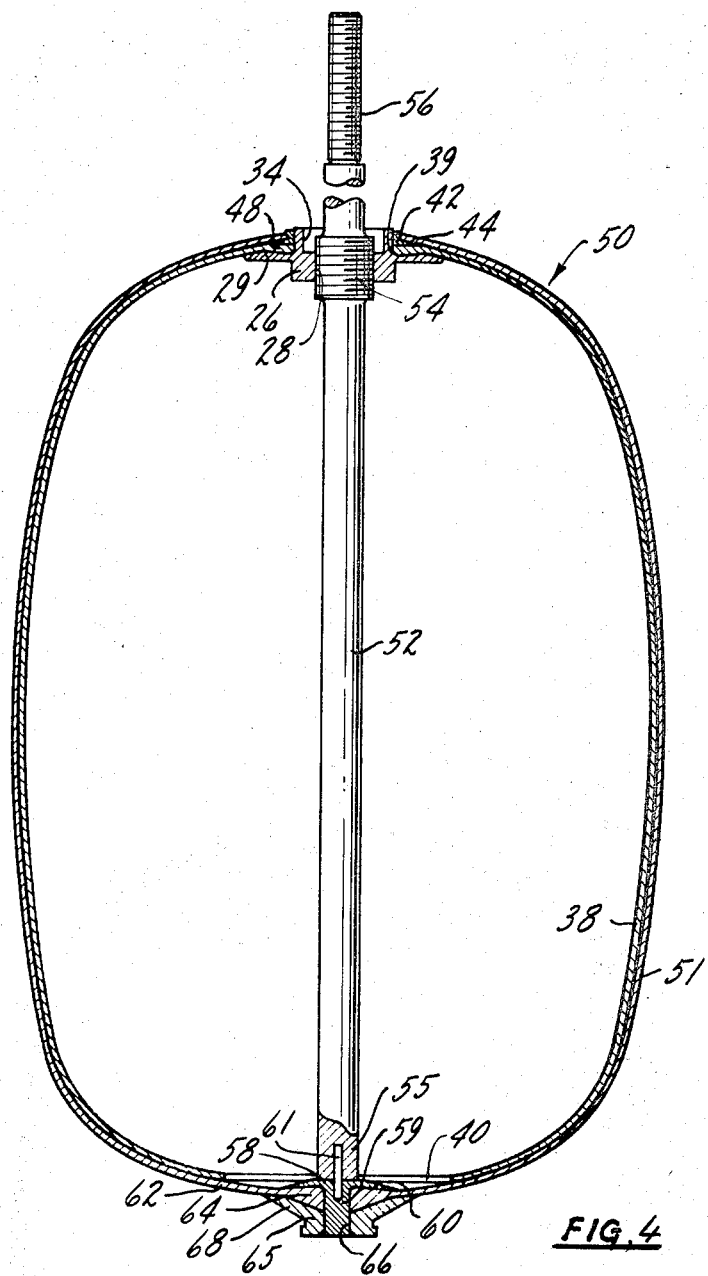
FIG. 4 is a view similar to FIG. 1, but here depicting the wound vessel after removal of the collapsible mandrel and after formation of the outer shell about the inner shell which here serves as a mandrel.

To resolve the difficulties noted above and in keeping with the principal objectives of the invention, it is contemplated that the cured and rigidified shell 38 will constitute the inner shell of a multiwalled vessel, indicated generally at 50 in FIG. 4, the exemplary vessel 50 here including an outer shell 51 formed by winding resin impregnated filaments about the shell 38 during a second winding stage in the vessel forming procedure of the present invention. In furtherance of this aspect of the invention, the previously wound and cured shell 38 is mounted on a drive shaft 52 (FIG. 4) by coupling the internal screw threads 28 on the fitting 26 with mating screw threads 54 formed on the shaft 52 intermediate the ends of the latter. The arrangement is such that the driven shaft 52 projects coaxially through the fitting 26 and the shell 38, the shaft terminating adjacent one end 55 in the general vicinity of the relatively large polar opening 40 formed in the shell. The opposite end of the shaft 52 (i.e., the upper end as viewed in FIG. 4) is preferably provided with an axially projecting portion having screw threads 56 or the like formed thereon for coupling the shaft to any suitable winding machine (not shown).

In the present form of the invention, a fitting 58 having an outwardly projecting axial hub portion 59 and a substantially radially extending annular flange 60 is detachably mounted on the end 55 of the shaft 52 by means of a detachable centering pin 61, the fitting 58 here being disposed in and generally coaxial with the opening 40 in the shell 38. However, in keeping with the invention, the fitting 58 is preferably considerably smaller in diameter than the hole 40 thereby minimizing the cost of the fitting as well as the weight and costs, including handling costs, of the completed vessel 50.

In carrying out this aspect of the invention, the assembled shell 38, fittings 26 and 58, and shaft 52 are now mounted in any suitable winding machine (not shown) by coupling the threaded portion 56 of the shaft 52 to the driving member of the winding machine. Resin impregnated or moistened filaments are then wound about the rigid inner shell 38, which now functions as a mandrel, so as to form an asymmetrically wound outer shell 51 which is in coextensive face-to-face contact with the inner shell 38. The arrangement is such that the annular gap remaining between the edge of the shell defining the opening 40 and the outer periphery of the fitting 58 is bridged by winding through open space as indicated at 62 (FIG. 4). Thus, the hole 40 previously formed in the shell 38 to permit removal of the collapsible mandrel 10 is now closed by means of the second stage windings (constituting the outer shell 51) and the fitting 58. This is, of course, permissible since in this instance the previously wound inner shell 38 is serving as a mandrel which can be left in place so as to form an integral part of the wound light-weight vessel 50.

It will be observed upon inspection of FIG. 4 that the outer shell 51 is here not only wound about the inner shell 38, and in bridging relation to the annular open space between the fitting 58 and shell 38, but, moreover, the shell 51 is wound in overlying relation with respect to the flange 44 on the retaining ring 42. This, of course, serves to more firmly seat the retaining ring 42 in place and thus strengthens and enhances the clamped connection of the inner shell edge 48 between the flanges 29, 44.

For the purpose of strengthening the connection between the fitting 58 and the shell 51, the flange 60 is preferably "dished" or formed with an outwardly facing concavity. During the second stage winding operation, a greater number of filaments are wound about the region of the vessel 50 overlying the concave flange 60, thus producing a thickened portion 64 of the shell 51 which is generally triangular in cross section (FIG. 4). Upon completion of the second stage winding operation, a retaining ring 65 having an axial bore 66 and an annular frustoconical flange 68 complementary in shape to the thickened portion 64 of the shell 51 is positioned on the axially projecting hub 59 of the fitting 58. Those skilled in the art will appreciate, therefore, that when the retaining ring 65 is firmly pressed into place, the wedge-shaped portion 64 of the outer shell 51 is effectively clamped between the flanges 60 and 68, thereby inhibiting radial withdrawal of the shell 51 from the fitting 58 when the vessel 50 is internally pressurized.

The particular means employed for securing the fitting 58 and retaining ring 65 together may vary without departing from the spirit and scope of the invention as expressed in the appended claims. For example, the hub 59 on the fitting 58 and the bore 66 on the retaining ring 65 could, if desired, include cooperable screw threads (not shown). Alternatively, since it is possible that screw threads formed on the hub 59 might, under some conditions, interfere with the filament winding operation, the fitting 58 and retaining ring 65 can simply be adhesively bonded together in a manner similar to that employed for coupling the fitting 26 and retaining ring 42. That is, when the ring 65 is applied, a coating of resin can be formed on either or both of the hub 59 or bore 66, thus securely bonding the two together during subsequent curing operations. In some instances, it is not necessary to apply additional resin or other adhesive since compressive loading on the shell portion 64 will tend to displace some of the resin in the impregnated fibers into the space between the hub 59 and bore 66.

The vessel 50 is now ready for a final curing operation. As in the previous curing operation described above, curing can be effected in any desired manner well known to those skilled in the art such, for example, as by heat treatment or chemical action. In this instance it is not essential that the vessel be cured while mounted on the shaft 52. However, advantageous results are achieved by curing the vessel prior to removal of the shaft 52 since this permits rotation of the vessel 50 and, consequently attainment of more uniform results. Similarly, the first stage curing operation for the inner shell 38 can also be conducted while the latter is rotated by driving the shaft 16 (FIG. 1).

Upon completion of the final curing operation, the vessel 50 and shaft 52 are separated by the simple expedient of unscrewing the mating screw threads 28, 54 and withdrawing the shaft 52 axially through the fitting 26. Thus the loose centering pin 61 is withdrawn from the fitting 58 and is simultaneously removed from the vessel 50.

Turning now to FIGS. 5–7, there is shown a slightly modified system for forming filament wound vessels which is somewhat similar in operation and construction to the system described above and which also embodies the present invention. In view of the similarity between the two exemplary vessel winding systems of the invention, like parts in both systems will be designated by identical reference numbers and those parts not common to the two systems will be designated by different reference numerals.

As shown in FIG. 5, the winding equipment used for forming filament wound vessels in accordance with the modified form of the invention includes a collapsible mandrel 10A which is quite similar in construction to the mandrel 10 shown in FIG. 1. Thus, the mandrel 10A includes a centrally disposed driven shaft 70 having screw threads 71 formed on one end thereof (the upper shaft end as viewed in FIG. 5) so as to permit coupling of the mandrel 10A to any suitable winding machine (not shown). As in the previous mandrel construction (i.e., the mandrel 10 in FIG. 1), the mandrel 10A (FIG. 5) also includes a plurality of stave members 11 having webs 12 terminating at one end (here the upper end) in axially extending projections 19 and at the other end in teeth 31. The axially extending projections 19 include tongues 22 which are received within an annular groove 24 formed in a relatively large hub 14. The hub 14 and stave 11 construction is identical to that previously described in that a plurality of partitions 21 are formed on the hub 14 so as to space the stave members 11 equidistantly about the perimeter thereof.

In carrying out the modified form of the invention however, provision is made for forming a wound filament vessel having only one polar opening formed therein. To this end, rather than using a hub assembly and detachable fitting similar to the assembly 15 and fitting 26 shown in FIG. 1, the opposite end of the shaft 70 (FIG. 5) supports an annular hub ring 72 which is mounted on the shaft 70 by means of cooperable screw threads 74, the outer face 75 of the hub ring 72 being shaped to confirm to the desired configuration of the lower extremity of the vessel—thus, in this instance the outer face 75 of the ring 72 is slightly convex. The hub ring 72 is provided with an annular marginal groove 30 which is complementary to and adapted to receive the teeth 31 formed on the stave members 11. Thus, the arrangement is such that the outer face 75 of the hub ring 72 and the radial extremity of the shaft 70 define a smooth continuation of the external mandrel surface formed by the stave members 11.

It will, of course, be appreciated that in this form of the invention the absence of a second fitting comparable to the fitting 26 (FIGS. 1 and 4) will ultimately introduce problems when attempting to center the inner shell preparatory to the second stage winding operation when an outer shell is formed. To obviate this difficulty, provision is made for winding an inner shell 76 during a first stage winding operation in such a manner that a precisely located, axially projecting, centering lug is formed integral with the inner shell 76. To accomplish this, and as best illustrated in FIG. 6, a conical dimple 78 is formed in the radial face of the shaft 70 adjacent the hub ring 72, the dimple 78 being coaxial with the shaft 70. Prior to the first stage filament winding operation, the dimple 78 is filled with a resinous material which is compatible with that with which the filaments forming the shell 76 are impregnated. Consequently, when the first shell 76 is wound and subsequently cured, the resinous material in the dimple 78 forms an axially extending centering lug 79 (FIG. 5) which is integral with the shell 76.

In the illustrative form of the invention shown in FIG. 6, the resinous material which will ultimately form the centering lug 79 is shown as comprising a preformed conical projection 79a having a radial flange 79b which covers the exposed radial face of the shaft 70 surrounding the dimple 78. Thus, the preformed or molded centering lug 79a, 79b may be reinforced by, for example, glass fibers or filaments of material similar to those which form the main body of the shell 76.

The mandrel 10A may be coated with any suitable release agent, if desired, prior to the first stage filament winding operation in a manner similar to those previously described, thus facilitating subsequent separation of the mandrel and the shell 76.

When the mandrel 10A is assembled and mounted in a suitable winding machine (not shown) with resinous material filling the dimple 78, the first stage filament winding operation is initiated. Thus, an asymmetrically wound inner shell 76 is formed on the mandrel 10A, which shell is similar to the shell 38 (FIG. 1) in all respects except that no polar opening is formed in the shell 76 at the end thereof remote from the hub 14. Upon completion of the first stage filament winding operation, the resinous material in the shell 76 (including that in the dimple 78) is cured in any suitable manner, thus rigidifying the shell. Thereafter, the mandrel is collapsed by unscrewing the shaft 70 from the hub 14 and hub ring 72, and removing the shaft 70 and hub 14 through the relatively large opening 40 formed in the polar end of the shell 76 surrounding the hub 14. Upon removal of the hub 14, the stave members 11 are released and they, along with the hub ring 72 and any film-like release agent employed, can be readily removed from the shell through the opening 40.

In keeping with the principal aspects of the present invention and as shown in FIG. 7, the inner shell 76 formed during the first filament winding stage and rigidified during the curing operation is now used as a mandrel during formation of the outer shell 80 in a second filament winding stage, the two shells 76, 80 defining a completed filament wound vessel 81. To this end, the inner shell 76 is mounted coaxially about a shaft 82 having one extremity (e.g., the upper extremity as viewed in FIG. 7) formed with screw threads 84 or the like for the purpose of coupling the shaft to a suitable winding machine (not shown). The opposite end of the shaft 82 includes a coaxially disposed dimple 85 which is complementary to the centering lug 79 on the inner shell 76 and into which the centering lug projects, thus centering the lower end of the shell 76 relative to the shaft 82.

In carrying out this form of the invention, a fitting 86 having an annular flange 88 is mounted on the shaft 82 by means of cooperable screw threads 89 formed on the fitting and on the shaft in the general region of the large polar opening 40 in the shell 76. Thus, the arrangement is such that the flange 88 bridges the annular space between the outer periphery of the fitting 86 and the marginal edge of the shell surrounding the polar opening 40. In the illustrative construction, the marginal portion of the inner face of the flange 88 is in circumferential face-to-face contact with the marginal outer face of the shell 76 adjacent the opening 40, thus permitting the two to be adhesively bonded together for the purpose of centering the upper end of the shell 76 relative to the shaft 82. Alternatively, the flange 88 can be, as here shown, slightly concave in configuration with the concavity facing the interior portion of the shell 76. Consequently, when the fitting 86 is screwed onto the shaft 82, the flange 88 and the shell 76 will define mating frusto-conical surfaces at least in the circumferential region of face-to-face contact therebetween, thus effectively centering the upper end of the shell 76 relative to the shaft 82. Thus, the shell 76, which is now to serve as a mandrel, is precisely centered relative to the shaft by means of the fitting 86 at one end and the integral shell centering lug 79 at the opposite end. Of course, it will be understood from the foregoing that the flange 88 need not be ring-like in configuration to achieve such results, but rather, it could have other configurations such, merely by way of example, as a spider (not shown) having generally radial spokes engaging the marginal edge of the shell 76 surrounding the polar opening, this further reducing the weight of the vessel 81, and it is in this context that the term "flange" is used herein and in the appended claims.

Before starting the second stage filament winding operation, a fitting 90 having a flange 91 may, if desired, be secured to the outer surface of the inner shell 76 in generally coaxial overlying relation with respect to the centering lug 79. Such fitting may be initially held in place in any suitable manner such, for example, as by adhesive or the like. The shaft 82 and shell 76 (which now define a forming mandrel) are now positioned in a suitable winding machine (not shown) and the outer shell 80 is formed by asymmetrically winding resin impregnated filaments about the shell 76. Incident to the winding operation certain of the filaments are wound in overlying relation with respect to the flanges 88, 91, thereby firmly clamping the fittings 86, 90 between the inner and outer shells 76, 80.

The resin impregnated outer shell 80 is now cured by, for example, suitable heat treatment or chemical action, thus rigidifying the vessel 81. Preferably such curing is conducted while the vessel 81 is still mounted on the shaft 82, thus permitting rotation of the vessel 81 during the curing treatment. And, of course, it will be understood that as an incident to the curing treatment the fittings 86, 90 will be firmly secured to the inner and outer shells 76, 80 by a resinous bond. Finally, the shaft 82 is unscrewed from the fitting 86 and withdrawn axially from the vessel, thus leaving a filament wound vessel 81 made in accordance with the present invention.

It will be appreciated from the foregoing that there has herein been disclosed novel methods for forming filament wound vessels which will find particularly advantageous utility where cost and weight factors require the use of only one or two relatively small diameter fittings. Thus, the exemplary multi-stage winding procedures described herein permit the use of relatively inexpensive collapsible mandrels during an initial filament winding stage when the inner shell is formed and, after the inner shell is cured, the mandrel is removed and the inner shell thereafter serves as a mandrel during a subsequent filament winding stage when an outer shell is wound. This, therefore, serves to insure that the completed vessel, and particularly the outer shell thereof, can be wound in such a manner that the vessel does not have a relatively large polar opening extending through its wall, this despite the fact that a collapsible and removable mandrel having large interiorly disposed components is used during a portion of the winding cycle. Thus, the need for heavy, costly fittings is eliminated, yet the winding system retains the ability to use collapsible mandrels which would otherwise necessitate the use of such heavy, costly fittings. Moreover, manufacturing costs are reduced since the mandrel is not "lost" each time a vessel is formed as is the case with mandrels that are, for example, left in place in the wound vessel or removed by melting or otherwise destroying the mandrel components.

Moreover, filament wound vessels made in accordance with the invention will be characterized not only by their economy and lightness in weight, but, moreover, by their strength and resistance to forces which tend to rupture the bond between the fittings and the wound shells. In addition, it will be noted that during the formation of the vessels 50 (FIG. 4) and 81 (FIG. 7), the inner shells 38 (FIG. 4) and 76 (FIG. 7) are subjected to two curing treatments—once while still positioned on the collapsible mandrel 10 and 10A respectively, and a second time when the outer shells 51 (FIG. 4) and 80 (FIG. 7) are cured. It has been found that the quality of the vessel ultimately formed is enhanced by procedures of this type wherein the inner shell is subjected to a second curing treatment.

Of course, it will be understood by those skilled in the art, that either the inner or the outer shells 38, 51 (FIG. 4) and 76, 80 (FIG. 7) could, if desired, each be constituted of multiple laminations rather than the exemplary single laminations here described without departing from the spirit and scope of the invention.

We claim as our invention:
1. The method of forming a filament wound vessel comprising the steps of:
   (A) assembling a collapsible mandrel including a hub and a plurality of circumferentially disposed stave members mounted on a shaft;
   (B) forming a resin impregnated first shell;
      said step B including the steps of (1) applying resin to filaments and (2) winding said filaments about the stave members with said resin applying and filament winding steps performed in any order so as to form a first shell having a polar opening surrounding the hub.
   (C) curing the resin in said first shell;
   (D) removing said hub, shaft and stave members from said first shell by axial withdrawal through the polar opening formed therein;
   (E) mounting said first shell coaxially about a second shaft having a flanged fitting detachably secured thereto with the fitting disposed in said polar opening and the flange at least partially bridging said opening;
   (F) forming a resin impregnated second shell enveloping said first shell;
      said step (F) including the steps of (1) applying resin to filaments and (2) winding said filaments about said first shell while using the latter as a mandrel and about the flange on said fitting with said resin applying and filament winding steps performed in any order;
   (G) curing the resin in said second shell to form a vessel consisting of said first and second shells; and
   (H) detaching said second shaft from said fitting.

2. The method of forming a filament wound vessel comprising the steps of:
   (A) assembling a collapsible mandrel including a shaft having a hub and hub assembly mounted thereon at axially spaced points with a plurality of circumferentially disposed stave members secured to said hub and hub assembly;
   (B) securing a detachable fitting to said hub assembly;
   (C) forming a resin impregnated first shell;
      said step (C) including the steps of (1) applying resin to filaments and (2) winding said filaments about the stave members and said fitting with said resin applying and filament winding steps performed in any order so as to form a first polar opening surrounding the hub;
   (D) curing the resin in said first shell to rigidify the latter and to resinously bond said fitting to said first shell;
   (E) collapsing said mandrel;
   (F) removng said mandrel from said first shell by withdrawing said hub, shaft, stave members and hub assembly axially through said opening;
   (G) mounting said fitting on a second shaft projecting axially through said first shell;
   (H) detachably securing a relatively small flanged fitting on said second shaft in the region of said large polar opening with said flange and said first shell defining an annular open space therebetween;

(I) forming a resin impregnated second shell enveloping said first shell;
　　said step (I) including the steps of (1) applying resin to filaments and (2) winding said filaments about said first shell while using the latter as a mandrel and about said flange with said filaments bridging said annular open space, said resin applying and filament winding steps performed in any order;
(J) curing the resin in said second shell so as to resinously bond said flanged fitting to said second shell and so as to form a vessel consisting of said first and second shells, said fitting and said flanged fitting; and,
(K) detaching said second shaft from said fitting and said flanged fitting.

3. The method of forming a filament wound vessel comprising the steps of:
(A) assembling a collapsible mandrel including a shaft having a pair of axially spaced hubs and a plurality of circumferentially disposed stave members extending therebetween with said shaft having an axially directed coaxial dimple formed at one end thereof;
(B) positioning resinous material in said dimple;
(C) forming a resin impregnated first shell;
　　said step (C) including the steps of (1) applying resin to filaments and (2) winding said filaments about the stave members with said resin applying and filament winding steps performed in any order and with said filaments overlying the resinous material in said dimple and in engagement therewith;
(D) curing the resin in said first shell to rigidify the latter and so that the resinous material in the dimple forms a centering lug integral with and projecting axially into said shell;
(E) collapsing said mandrel;
(F) removing said mandrel from said first shell through an opening formed therein surrounding the polar remote from said lug;
(G) mounting said first shell on a second shaft having an axially directed dimple formed at one end thereof with said lug positioned in the dimple in said second shaft;
(H) detachably securing a flanged fitting on said second shaft in the region of said opening;
(I) urging said flanged fitting axially towards said first shell so that the flange thereon engages the marginal edge of said first shell surrounding the opening;
(J) forming a resin impregnated second shell enveloping said first shell;
　　said step (J) including the steps of (1) applying resin to filaments and (2) winding said filaments about said first shell while using the latter as a mandrel and about the flange on said fitting with said resin applying and filament winding steps performed in any order;
(K) curing the resin in said second shell so as to resinously bond said fitting to said first and second shells and so as to form a vessel consisting of said first and second shells and said fitting; and,
(L) detaching said second shaft from said fitting.

4. The method of forming a filament wound vessel comprising the steps of forming a collapsible mandrel, securing a detachable flanged fitting to one polar end of said mandrel, forming a first wound shell of resin impregnated filaments about said mandrel and overlying the flange of said fitting with said first shell having a relatively large polar opening at the opposite polar end of said mandrel, curing said first resin impregnated shell to rigidify the latter and so as to resinously bond said fitting to said first shell, detaching said mandrel from said fitting and removing said mandrel through said opening, mounting said fitting and said first shell on a shaft extending coaxially through said first shell and said fitting, positioning a second flanged fitting on said shaft in the region of said opening with said second wound shell of fitting and said first filaments defining an annular open space therebetween, forming a second resin impregnated shell about said first shell while using the latter as a mandrel with the windings of said second shell overlying the flange on said second fitting and bridging and thus closing said annular open space, and curing the composite vessel defined by said first and second resin impregnated shells and said first and second fittings.

5. The method of forming a filament wound vessel comprising the steps of forming a collapsible mandrel, securing a detachable flanged fitting to one polar end of said mandrel, forming a first wound shell of resin impregnated filaments about said mandrel and overlying the flange on said fitting with said first shell having a relatively large polar opening at the opposite polar end of said mandrel, positioning a flanged retaining ring on said fitting with the flange on said ring overlying said first shell, pressing said flanged fitting and said flanged ring relatively towards one another so as to compressively load the portion of said first shell clamped therebetween, curing said first resin impregnated shell to rigidify the latter and so as to resinously bond said fitting, said ring and said first shell to one another, detaching said mandrel from said fitting and removing said mandrel through said opening, mounting said fitting and said first shell on a shaft extending coaxially through said first shell and said fitting, positioning a second flanged fitting on said shaft in the region of said opening with said second fitting and said first shell defining an annular open space therebetween, forming a second wound shell of resin impregnated filaments about said first shell while using the latter as a mandrel with the windings of said second shell overlying the flange on said second fitting and bridging and thus closing said annular open space, positioning a second flanged retaining ring on said second fitting with the flange on said second ring overlying said second shell, pressing said second flanged fitting and said second flanged ring relatively towards one another so as to compressively load the portion of said second shell clamped therebetween, and curing the composite vessel defined by said first and second resin impregnated shells so as to resinously bond said second shell, said second fitting and said second retaining ring to one another.

6. A mandrel for forming a filament wound vessel on a filament winding machine, said mandrel comprising a rigid filament wound shell having a relatively large polar opening formed in one end thereof, an annular coaxial fitting projecting through said shell at the opposite end thereof, said fitting having a generally radial flange in engagement with and resinously bonded to the inner surface of said shell, a shaft drivingly coupled to said fitting and axially detachable therefrom, said shaft extending axially through said shell and having a terminal end in the region of said relatively large polar opening, and a second fitting disposed on said shaft terminal end and detachable therefrom, said second fitting including a generally radial flange having a smaller outer diameter than the diameter of said opening, said flange being concave in cross-section with the concavity defined thereby facing outwardly.

7. A mandrel for forming a filament wound vessel on a filament winding machine, said mandrel comprising a rigid filament wound shell having a relatively large polar opening formed in one end thereof, an annular coaxial fitting projecting through said shell at the opposite end thereof, said fitting having a generally radial flange in engagement with and resinously bonded to the inner surface of said shell, a retaining ring coupled to said fitting, said retaining ring having a generally radial flange in engagement with and resinously bonded to the outer surface of said shell so that the latter is clamped between the flanges on said fitting and said ring, and means on said fitting adapted for drivingly coupling said shell to a filament winding machine.

8. A mandrel for forming a filament wound vessel on a filament winding machine, said mandrel comprising a rigid filament wound shell having a relatively large polar opening formed in one end thereof, an annular coaxial fitting projecting through said shell at the opposite end thereof, said fitting having a generally radial flange in engagement with and resinously bonded to the inner surface of said shell, a retaining ring coupled to said fitting, said retaining ring having a generally radial flange in engagement with and resinously bonded to the outer surface of said shell so that the latter is clamped between the flanges on said fitting and said ring, at least one of said flanges defining a concavity facing the other of said flanges, said flanges being urged together so that the portion of said shell clamped therebetween assumes a wedge-shaped configuration having a wall thickness adjacent the fitting greater than the wall thickness adjacent the periphery of said retaining ring flange, and means on said fitting adapted for drivingly coupling said shell to a filament winding machine.

9. A mandrel for forming a filament wound vessel, said mandrel comprising, in combination, a rigid filament wound shell having a relatively large polar opening formed in one end thereof, a coaxial inwardly projecting centering lug integral with said shell and formed on the opposite end thereof, a shaft extending coaxially through said shell and projecting axially through said opening, said shaft releasably engaged with said centering lug, and a fitting releasably mounted on said shaft and disposed within said opening, said fitting having a generally radial flange in engagement with the marginal edge of said shell defining said opening for centering said opening relative to said shaft.

10. A mandrel for forming a filament wound vessel, said mandrel comprising, in combination, a rigid filament wound shell having a relatively large polar opening formed in one end thereof, a coaxial inwardly projecting centering lug integral with said shell and formed on the opposite end thereof, a shaft extending coaxially through said shell and projecting axially through said opening, said shaft releasably engaged with said centering lug, a fitting releasably mounted on said shaft and disposed within said opening, said fitting having a generally radial flange in engagement with the marginal edge of said shell defining said opening, and means for securing said flange to said shell with said opening centered relative to said shaft.

11. A mandrel for forming a filament wound vessel, said mandrel comprising, in combination, a rigid filament wound shell having opposed generally convex polar ends with a relatively large polar opening formed in one polar end thereof, a coaxial inwardly projecting centering lug integral with said shell and formed on the opposite end thereof, a shaft extending coaxially through said shell and projecting axially through said opening, said shaft releasably engaged with said centering lug, a fitting releasably mounted on said shaft and disposed within said opening, said fitting having a generally radial flange in engagement with the marginal edge of said shell defining said opening, said flange having a concave cross section with the concavity defined thereby facing inwardly so that said flange defines a smooth continuation of the adjacent convex polar end of said shell and cooperates therewith to center said shell relative to said shaft.

References Cited

UNITED STATES PATENTS

| 2,814,329 | 11/1957 | Sitton | 156—429 XR |
| 3,279,967 | 10/1966 | Martin et al. | 156—172 |
| 2,718,583 | 9/1955 | Noland et al. | 220—3 |
| 2,966,935 | 1/1961 | Wiltshire | 156—172 XR |

FOREIGN PATENTS

| 250,808 | 4/1964 | Australia. |

EARL M. BERGERT, *Primary Examiner.*

PHILIP DIER, *Assistant Examiner.*